(12) United States Patent
Allen et al.

(10) Patent No.: US 7,743,000 B2
(45) Date of Patent: Jun. 22, 2010

(54) PRINTER

(75) Inventors: Kram Henry Allen, Meridian, ID (US); Linn James Kropf, Boise, ID (US); Brett Green, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2895 days.

(21) Appl. No.: 10/196,989

(22) Filed: Jul. 16, 2002

(65) Prior Publication Data

US 2004/0012644 A1    Jan. 22, 2004

(51) Int. Cl.
*G06Q 99/00* (2006.01)
(52) U.S. Cl. ................... 705/400; 705/408
(58) Field of Classification Search ........... 705/408, 705/400
See application file for complete search history.

(56) References Cited

U.S. PATENT DOCUMENTS

| 5,383,129 | A | 1/1995 | Farrell | 705/400 |
|---|---|---|---|---|
| 5,850,584 | A | 12/1998 | Robinson | 399/79 |
| 6,064,838 | A | 5/2000 | Maruta | 399/79 |
| 6,801,731 | B2 * | 10/2004 | Parker | 399/79 |
| 2003/0002056 | A1 * | 1/2003 | Yamaguchi et al. | 358/1.2 |
| 2003/0084006 | A1 * | 5/2003 | Hobbs | 705/400 |

FOREIGN PATENT DOCUMENTS

| EP | 1056030 | 11/2000 |
|---|---|---|
| GB | 2382691 | 6/2003 |

* cited by examiner

*Primary Examiner*—Akiba K Robinson Boyce (57) ABSTRACT

A printer which provides detailed information on usage of consumables such as paper, ink, toner, etc., aiding in planning print tasks and ordering supplies. The printer also provides information on printer setting usage and print costs.

18 Claims, 6 Drawing Sheets

PRINTER

FIELD OF THE INVENTION

This invention relates generally to printers and more specifically to providing printer usage costs to users.

BACKGROUND

Printers, such as black and white and color laser printers, are used for a wide range of tasks, from personal home use to use by the largest corporations and governments. Print quality has steadily risen as cost has decreased, and printers are now commonly used for tasks previously performed only by commercial printers.

However, monitoring and controlling print costs, almost always a critical task, has remained difficult. Managing print costs has in fact become more complex, as most printers now provide a number of different settings. These settings, such as resolution, print density, or paper type, are typically configurable either using the printer control panel or through software executing on a computer connected to the printer. Printer settings affect the print costs as well as the print quality. Some settings are even labeled in terms of relative cost, such as "Economy Mode," rather than identifying the actual print characteristics to be changed. Many printer settings are thus an attempt to enable the user to manage print costs and usage of resources such as toner and paper.

Unfortunately, printers currently available do not directly help users to manage print costs using printer settings. Users are aware only that they should save money if they reduce print quality by changing the print settings. This does not provide much useful information to a user who needs to balance print quality with cost, such as when selecting the best print quality to use to meet a budget, or to decide between in-house printing and commercial printing for given print jobs.

SUMMARY

An embodiment of the invention is a printer having a plurality of selectable print settings, a memory containing consumable costs for each of the plurality of selectable print settings, and an output for reporting the consumable costs. Another embodiment of the invention is a method of reporting print costs for a printer, including receiving a request for print cost information, reading the print cost information from a memory, and outputting the print cost information

BRIEF DESCRIPTION OF THE DRAWING

Illustrative embodiments of the invention are shown in the accompanying drawing, in which.

DESCRIPTION

The drawing and description, in general, disclose various embodiments of a method and apparatus which provide print costs and usage details of a printer. Print costs are the costs associated with printing, including the cost of the print media and coloring agents such as ink or toner. Print costs may even include the purchase price or maintenance expenses of the printer itself, spread out over the life of the printer. Printer usage includes information on how the printer is used, including what printer settings are selected and the quantity of consumables used. Printer cost and usage reporting is particularly beneficial for printers having multiple selectable print quality settings, paper sizes and types, or other types of options. However, cost and usage reporting would be beneficial even in a printer having no options and only one possible size and type of paper by facilitating cost and supply management and print job planning.

Print cost and usage reporting provides information to users of a printer about how it is being used, such as which driver settings are most economical, which driver settings are used the most, and the average cost per page for a given driver configuration. This type of information gives a user a much better idea of how much the printer costs to operate, enabling the user to better plan print jobs, such as whether a print job should be outsourced or whether it would be economical to use the resident printer. It also enables the user to intelligently configure the printer, balancing the print quality against the actual print cost.

Print cost and usage reporting may also provide information about the consumables used in the printer, such as paper and toner. For example, statistics may be gathered about which paper sizes and types are used the most, the average amount of paper that a printer consumes per day, week, or month, and the average cost of paper consumption per day, week, or month. This enables the user to order paper or other print media so that it is available as it is needed, helping prevent unexpected paper expenses. Statistics may also be tracked about coloring agents such as ink or toner, including the average cost of coloring agents per job, the average cost per page per job, the average cost per day, week or month, and the average life of each unit of coloring agent. This enables the user to order coloring agents such as toner cartridges intelligently and to optimize printer settings to efficiently use the coloring agents.

Thus, print cost and usage reporting greatly aids users in managing a printer and the associated consumables. This information illustrates for the user the effects of changing printer settings, making each feature of the printer more understandable. Cost and usage reporting is applicable to both high-end and low-end printers without requiring a great deal of extra hardware in the printer.

Cost and usage reporting as described herein is not limited to use with any particular type of printer. For example, it can be applied to printers using any type of print media, such as plain paper, photographic paper, tractor-fed paper, transparencies, thermal rolls, etc. It can be applied to any type of coloring agent, such as ink, dyes, pigment, toner, etc. The printer is not limited to any particular type of input or connection. For example, the printer may be connected to a personal computer using any suitable connection type, such as a parallel printer port, universal serial bus (USB), or Ethernet connection, or the printer may be a standalone device that receives photos from digital cameras by infrared connection. The printer may be configured in any desired manner, such as by a front panel interface, a printer driver in an associated personal computer, or using a network identifier such as a uniform resource locator (URL) to access the printer.

Figure 1:
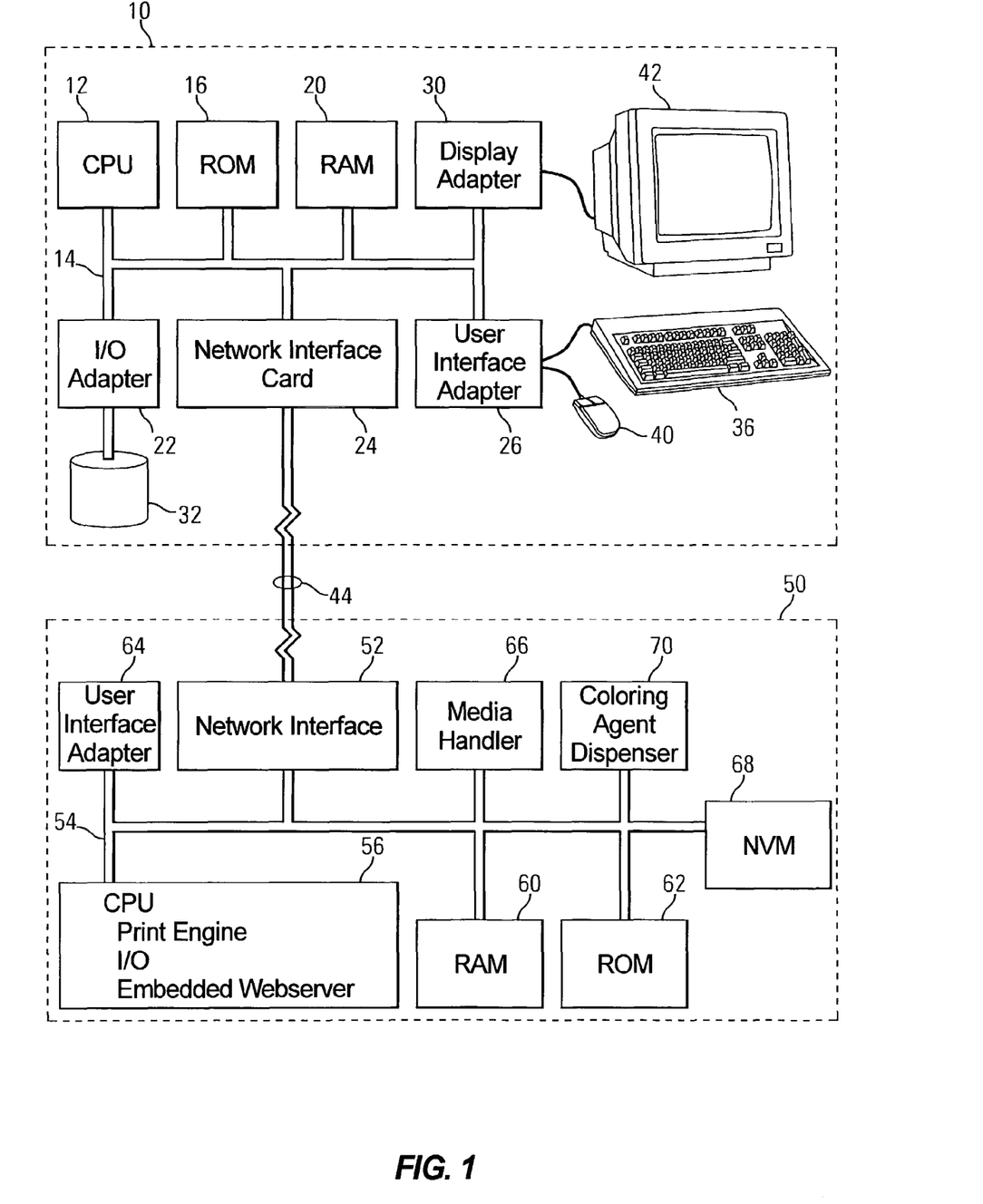
FIG. 1 is a block diagram of an embodiment of an exemplary computer and printer which may report print cost and usage information, where the printer is connected to the computer by a network connection.

Referring now to FIG. 1, a first exemplary embodiment of cost and usage reporting in a printer will be described. In the first embodiment, the printer 50 is connected to a computer 10 by an Ethernet connection 44. The printer 50 receives information to print from the computer 10.

A typical exemplary computer system 10 which may be connected to the printer 50 is illustrated in the block diagram of FIG. 1. The computer system 10 includes a central processing unit (CPU) 12 connected by a system bus 14 to devices such as a read-only memory (ROM) 16, a random access memory (RAM) 20, an input/output (I/O) adapter 22, a network interface card (NIC) 24, a user interface adapter 26, and a display adapter 30. Data storage devices such as a hard drive 32 are connected to the computer system 10 through the I/O adapter 22. In operation, the CPU 12 in the computer system 10 executes instructions stored in binary format on the ROM 16, on the hard drive 32, and in the RAM 20, causing it to manipulate data stored in the RAM 20 to perform useful functions. The computer system 10 transfers information to the printer 50 across a local area network (e.g., 44) connected to the NIC 24. User input is obtained through input devices such as a keyboard 36 and a pointing device 40 which are connected to the computer system 10 through the user interface adapter 26. Output is displayed on a display device such as a monitor 42 connected to the display adapter 30.

The printer 50 will be described in generic terms, as cost and usage reporting is not limited to any particular type of printer. The printer 50 includes a network interface 52 to communicate with the computer 10. A bus 54 inside the printer 50 connects the various components of the printer 50, such as the network interface 52, a CPU 56, RAM 60, ROM 62, a user interface adapter 64, a media handler 66 and a coloring agent dispenser 70. The CPU 56 handles any processing requirements in the printer 50, such as providing a print engine to process incoming data from the computer 10 to generate a printed page, handling other I/O tasks such as processing user and computer interfaces, and providing an embedded web server (described hereinafter). Print cost calculations may be performed by an accounting device in the printer 50, such as the CPU 56. Permanent programming for the printer 50 can be stored in the ROM 62. For example, the ROM 62 may store power-on procedures and instructions for processing printer commands from the computer 10, which may arrive in any suitable fashion, such as in the Printer Command Language (PCL) provided by the Hewlett-Packard Company of Palo Alto, Calif. The RAM 60 is used for any necessary temporary storage requirements, such as storing information from the computer 10 to be printed. Non-volatile memory (NVM) 68 may be provided for storing information which needs to be preserved across power cycles, including cost and usage information to be described in more detail hereinafter. (Alternatively, information may be preserved over power cycles in the RAM 60 with a battery backup.)

The user interface adapter 64 may control a display on the printer 50, indicating the status of the printer 50 to the user, including errors or jams, lack of media or coloring agents, and whether the printer 50 is on-line to accept data or is busy printing. The user interface adapter 64 may also process input from one or more buttons on the printer 50, enabling the user to directly input information or otherwise control the printer 50.

In this exemplary embodiment in which the printer 50 is connected to the computer 10 across an Ethernet network 44, the printer 50 may either be controlled by printer drivers installed in the computer 10, or by web pages in the printer 50 accessible by a browser application in the computer 10 via a uniform resource locator (URL), by a combination of the two methods, or by any other suitable method now known or that may be developed in the future.

Consumables in the printer 50 are handled by metering devices, such as the media handler 66 and coloring agent dispenser 70. The media handler 66 physically moves the print media, such as paper, through the printer 50 while the coloring agent dispenser 70 places coloring agents on the print media to form printed images. The design and operation of the media handler 66 and coloring agent dispenser 70 is dependent upon the printer 50, and is not limited to any particular configuration for printer cost and usage reporting. For example, if the printer 50 is a laser printer, the media handler 66 may include paper trays, paper handling rollers, drive motors, etc, and the coloring agent dispenser 70 may include toner cartridges, a laser, a movable scanning mirror, a photostatic drum, a fuser, and corona wires for manipulating static electrical charges in the system, etc. If the printer 50 is an inkjet printer, the coloring agent dispenser 70 may include inkjet cartridges, print heads, and print head drive motors and carriages, etc. Regardless of the details of the media handler 66 and coloring agent dispenser 70, they typically work together to manage the consumables in the printer 50 under the control of the CPU 56. As the CPU 56 controls consumable usage, it can track their usage for reporting and for use in calculating print costs.

Now that an exemplary computer 10 and printer 50 which may be used for printer cost and usage reporting have been described, the cost and usage reporting will be described in more detail. In the first exemplary embodiment, cost and usage data is tracked and calculated inside the printer 50 by an applet executing on the CPU 56. Many types of usage data can be collected and stored by the applet, preferably in a non-volatile memory in the printer 50 so that it is not deleted when the printer 50 is turned off. The data to be collected and stored are dependent upon the types of statistics to be generated and reported. For example, to aid in ordering supplies, the printer 50 can track the rate of paper consumption by paper size and type. The printer 50 may then report this information so that the user can determine when supplies of each type of print media need to be reordered at the current rate of consumption.

Cost and usage data may be tracked and calculated in any manner desired. For example, the applet code executing on the CPU 56 of the present exemplary embodiment may be firmware stored in the ROM 62, written in any programming language suitable for the CPU 56 and the printer 50. The applet may need to be adapted according to the instruction set of the CPU 56 or other processor in the printer 50, and to the operating system, if any, being executed by the CPU 56. The applet may alternatively be hard coded in a hardware device such as an application-specific integrated circuit (ASIC).

Collected data may include any desired information, such as:
- amount of each coloring agent used per page overall
- amount of each coloring agent used per page per job
- amount of each coloring agent used per page in a given print quality setting
- number of pages per job
- number of pages per job in a given print quality setting
- average amount of print media consumed per day/week/month
- media pages of a given type consumed per day/week/month
- frequency of usage of each print quality setting
- average life of a container of each type of coloring agent (such as cyan, magenta, yellow, and black ink cartridges)

Certainly other types of data may be collected as desired and based upon the particular printer 50. Calculations are used as needed to collect this data. For example, to determine the amount of yellow ink used per page in an inkjet printer, any number of techniques may be used to monitor how much ink is consumed. One applicable technique is to count the number of yellow dots printed on the page, weighting the value of each pixel by the intensity or density of the dot, and calculating the volume of yellow ink consumed given the volume required for a full intensity yellow dot.

In the first exemplary embodiment of printer cost and usage reporting, the price for a unit or a given volume of a variety of consumables used in the printer 50 is entered into the printer 50 for use in statistics calculations (e.g., the price of a sheet of letter bond paper). This information may be entered into the printer in any desired manner, such as through a web page in an embedded web server in the printer 50, accessible by a browser application in the computer 10 using a URL identifying the page. The embedded web server may be generated using well-known techniques in the printer 50. The printer 50 of the first exemplary embodiment is provided with default consumable prices which may then be overridden by the user.

With this consumable price information and usage data, print costs can be calculated. To extend the example above of the yellow ink used in an inkjet printer, the cost per page of yellow ink can be calculated based on the price for a cartridge of yellow ink having a given volume. The calculated average volume of yellow ink used per page (in a given unit) is calculated and multiplied by the price of yellow ink (for a volume of the same given unit).

Calculated print costs and other statistics can include any desired information, such as:
- average cost per page for a given print quality setting
- average cost of print media consumption per day/week/month
- average cost per job
- average cost per page on a per job basis
- average cost per day/week/month As with the types of data collected, other types of statistics may be calculated as desired and according to the particular printer 50, including the available print quality settings, types and sizes of consumables, etc. For example, one desired report may indicate that the most popular printer settings are for letter sized white plain paper printed in draft mode at 600 dots per inch (DPI), with the average page being 87% black, 3% cyan, 4% magenta and 6% yellow. The report may further indicate the average cost per page with these most popular printer settings, the rate that letter sized while plain paper and each ink color are used, and the approximate day that each color of ink will run out at the current rate.

Various code has been referred to above. This code may be stored on any computer-readable medium for use by or in connection with any computer-related system or method. The code may be embodied in any computer-readable medium for use by any instruction-executing device, such as a general purpose processor, software emulator, application-specific circuit, etc, that can access and execute instructions in the code. The term "computer-readable medium" refers to any means that can store, transmit, communicate, or in any way propagate the code for use by or in connection with the instruction-executing device. For example, the computer-readable medium may be (but is not limited to) any electronic, magnetic, optical, or other storage device, or any transmission medium such as an electrical conductor, an electromagnetic, optical, or infrared transmission, etc. Specific examples of computer-readable media include computer diskettes or compact disc read only memories (CDROMs), network cables, a RAM, a ROM (including programmable and erasable ROMS), non-volatile memories (NVMs), optical fibers, etc. Note that even a code printout on paper is a computer-readable media, as the paper can be optically scanned to retrieve the code, which can then be compiled, assembled, stored and executed as necessary in the instruction-executing device.

Printer cost and usage may be reported in a number of manners, such as in a web page provided by an embedded web server in the printer 50, or in dialog boxes displayed by the computer 10 provided either by printer drivers or the operating system (OS) in the computer 10, or on a front panel display on the printer 50.

Figure 2:
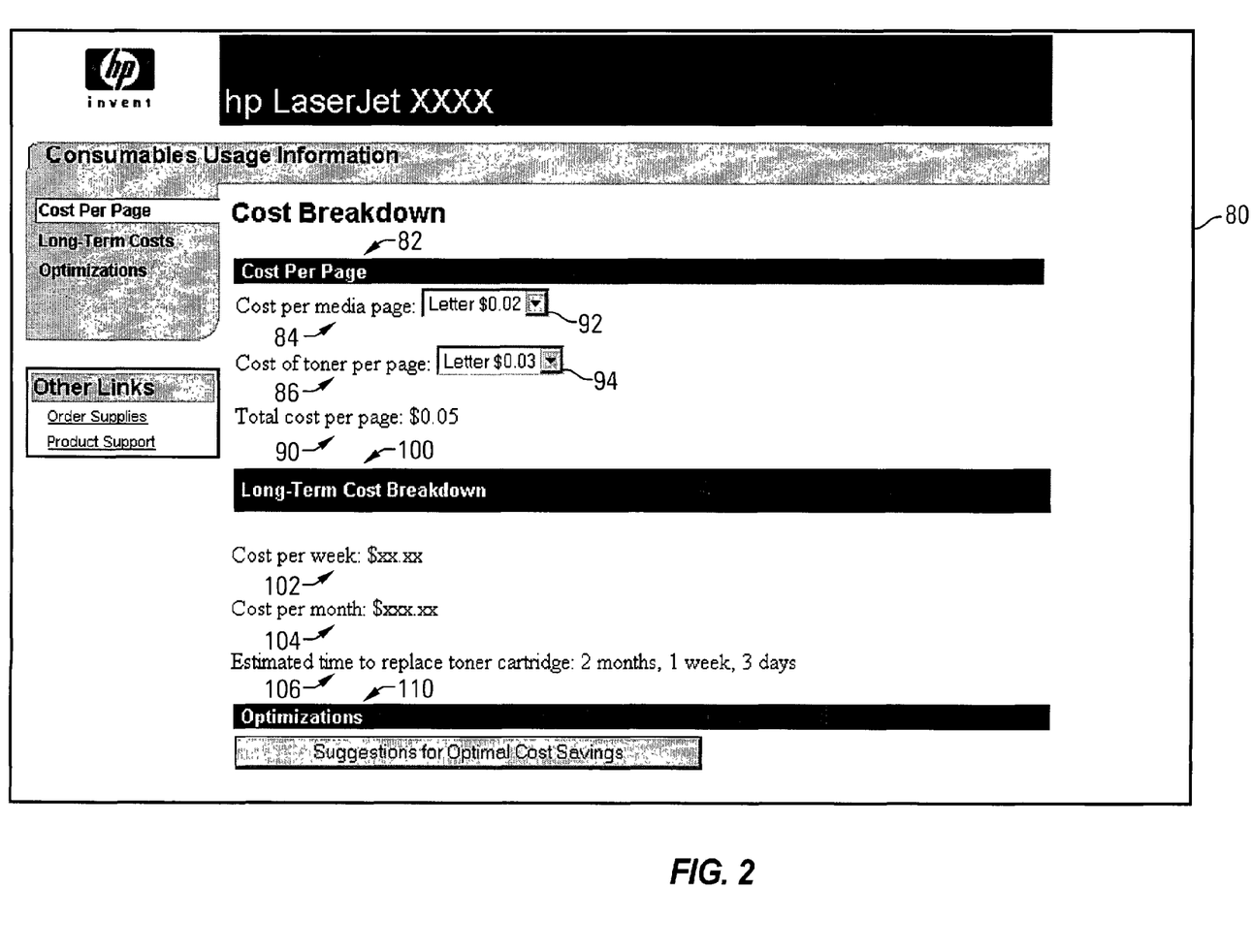
FIG. 2 is a screen capture of an exemplary web page generated by an embedded web server in a printer to report print cost and usage information.

Referring now to FIG. 2, a web page 80 provided by the printer 50 of the first exemplary embodiment will be described. The web page 80 is accessed and displayed by a world-wide web (WWW) browser application, such as the Netscape™ browser available from the Netscape Communications Corporation of Mountain View, Calif. The URL of the web page 80 is entered into the browser, enabling it to access information from the embedded web server in the printer 50. Depending upon the network topology and security configuration, the accessibility of the web page 80 may be limited to devices on the same local area network (LAN) as the printer 50. The internet protocol (IP) addresses identified by the URLs of web pages (e.g., 80) provided by the embedded web server in the printer 50 may be configurable if desired to prevent address conflicts in the network.

The exemplary web page 80 of the first embodiment reports cost and usage information for the printer 50, but printer configuration is left to existing printer drivers in the computer 10. Alternatively, the web page 80 may be used to configure the printer 50 as well, accepting input as well as providing output.

The web page 80 may display any cost or usage information desired, such as the cost per page 82 to print, including the cost per media page 84, the cost of coloring agents per page 86, and the total cost per page 90. The cost per media page 84 and coloring agents per page 86 may be calculated for each media type and size, thus the report may indicate the print costs as well as the media type and size (e.g., 92 and 94).

The exemplary web page 80 may also report long-term costs 100, such as the overall print cost per week 102 or month 104. This may also be broken down by print job or by media type and size, or by details of the coloring agents used, such as by black and white prints versus colored. The exemplary web page 80 may also report anticipated consumable usage to aid the user in ordering supplies, such as the expected life of a toner cartridge 106.

The exemplary web page 80 may further suggest optimizations 110 for cost savings, such as the best print quality setting to use, or the best media size and type to use. These optimizations may be based on actual consumable prices and print cost and usage of the individual printer 50.

The printer 50 may recalculate printer cost and usage information each time consumable price information is updated and each time a print job is processed. Alternatively, the printer 50 may recalculate cost and usage information at predetermined intervals, or may perform partial calculations at each print job with report updates periodically.

Reporting printer cost and usage information in a web page 80 on an embedded web server in the printer 50 has several advantages over driver-based reporting or other methods. For example, an embedded web server is easier to support than drivers for an operating system, as there is no need to support multiple operating systems, there is less installation difficulty on the computer 10, etc. Depending upon the network topology and security configuration, cost and usage information may be made more widely available by an embedded web server than by driver-based reporting or other methods.

Printer cost and usage reporting enables users to better manage their print jobs and consumables, with little to no additional hardware requirements in the printer. Printer cost and usage reporting gives the user feedback about the operating costs of the printer in various printer settings and with various media types and sizes and with different coloring agents. This enables the user to intelligently decide when to process print tasks in-house and when a commercial printer would be more cost effective.

Figure 3:
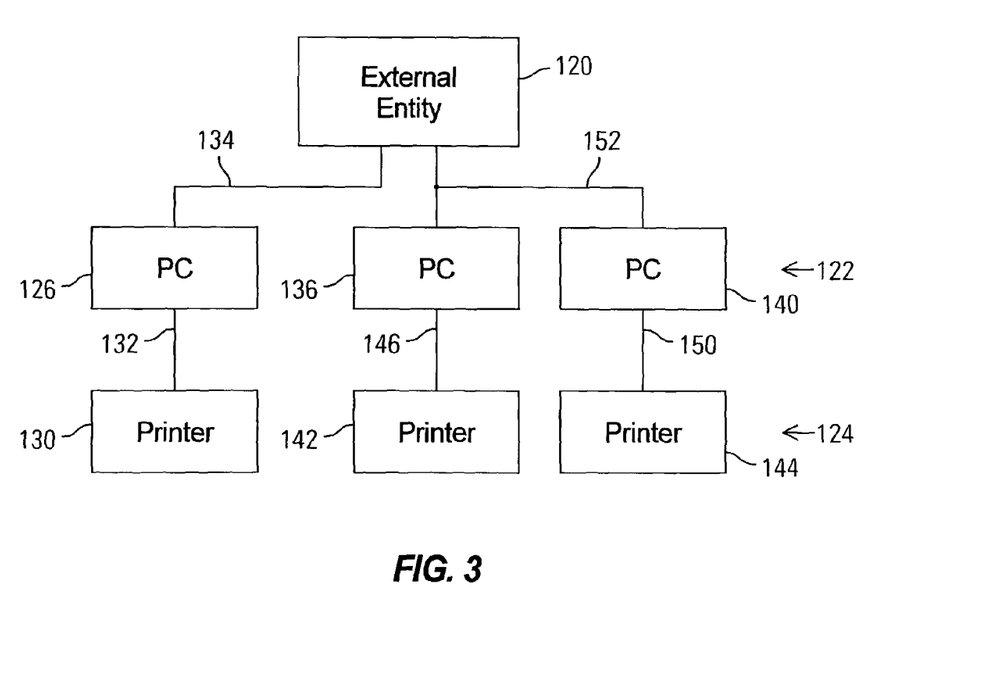
FIG. 3 is a block diagram of an embodiment of an exemplary system in which multiple printers provide usage information to an external entity for print cost calculations.

Referring now to FIG. 3, a second exemplary embodiment of cost and usage reporting in a printer will be described. In the second embodiment, usage information for multiple printers 124 is communicated to an external entity 120. Cost information is calculated by the external entity 120 based on usage information gathered from the multiple printers 124 to generate cost information that is uniform for all printers of the same type. The cost information is then disseminated to the multiple printers 124 from the external entity 120 for display by the multiple printers 124.

The external entity 120 may be anything for collecting usage information and calculating print costs, such as a company, a computer, a trade association, a consumables supplier, etc. The external entity 120 may be embodied in a single location, or it may be divided into multiple components in location and/or function. In the exemplary second embodiment, the external entity 120 is the printer manufacturer. By collecting usage information for multiple printers 124, then calculating and disseminating print costs, the printer manufacturer can generate print costs that are uniform for all printers of that type and can provide more accurate default costs for the printer. The usage information may also help the printer manufacturer to better design cost effective printers with options such as print quality settings that users want.

Typically, each printer (e.g, 130, 142, and 144) is connected to a computer such as a personal computer (PC) (e.g., 126, 136, and 140, respectively) by connections (e.g., 132, 146, and 150, respectively) which are either direct and unique, or shared, such as on a LAN. In the second exemplary embodiment, the printers 124 of a given type which communicate usage information to the external entity 120 are typically located in many countries and used by a great number of different owners. Thus, the mechanism used to transfer usage information to the external entity 120 is designed to protect the privacy of the users and to transfer only that information needed to calculate print costs. The usage information transmitted to the external entity 120 thus consists of data required to calculate the print costs, such as the average amount of coloring agent used in each print quality setting for the various media sizes and types. As in the first exemplary embodiment above, the actual types of cost and usage information are dependent upon the printer and are not limited to any specific examples given herein.

Usage information may be sent to the external entity 120 periodically in any suitable manner, such as by creating a window on the computer (e.g., 126, 136, or 140) when the computer is turned on, asking the user whether usage information can be transmitted, or by sending the usage information when the user connects to the external entity 120 for other reasons such as to obtain updated printer drivers.

The external entity 120 may include the usage information in print cost calculations in the same way as an individual printer 50 of the first exemplary embodiment, except that the usage information from the multiple printers 124 is averaged. Alternatively, the usage information from the multiple printers 124 may be treated in different ways, such as weighting information differently for various reasons, such as taking into account consumable price variations by region.

The multiple printers 124 and their respective computers 122 may transmit usage information to the external entity 120 by any suitable means, such as a direct electronic connection 134 or across the Internet 152.

In the second exemplary embodiment, the usage information is first retrieved by the computers 122, then transmitted from the computers 122 to the external entity 120. Alternatively, if the network configuration and security protocol of the networks to which the printers are attached allow, the usage information may be transmitted directly from the printers 124 to the external entity 120.

Similarly, the print cost information calculated by the external entity 120 is transmitted back to the computers 122, then from the computers 122 to the printers 124. For example, print cost information may be transmitted from the external entity 120 to the computers 122 when they are connected to the external entity 120 to obtain updated printer drivers. The print cost information is stored in the printers 124 in an internal memory such as an NVM 68, overriding default or previous print cost information already stored in the printers 124. The printers 124 then display the cost and usage information in any suitable manner, as described above with respect to the first exemplary embodiment. Alternatively, the print cost information may be stored and displayed in the computers 122 rather than the printers 124.

Figure 4:
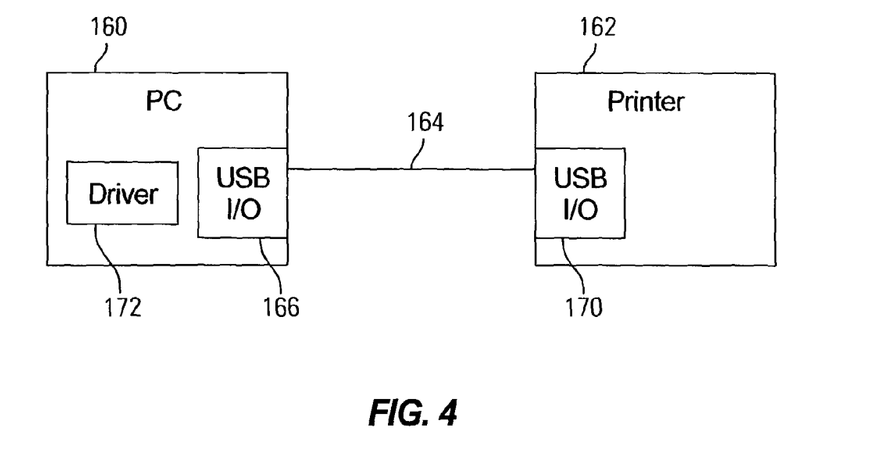
FIG. 4 is a block diagram of an embodiment of an exemplary computer and printer which may report print cost and usage information, where the printer is connected to the computer by a universal serial bus.

Referring now to FIG. 4, a third exemplary embodiment will be described in which cost and usage information is collected and stored in a printer 162 and displayed in an associated computer 160 via drivers in the computer 160. In this embodiment, the computer 160 and printer 162 communicate on a universal serial bus (USB) 164 connected to USB interfaces 166 and 170 in the computer 160 and printer 162. The computer 160 configures the printer 162 using a driver 172 loaded on the computer 160. The driver 172 provides an interface between applications and an operating system on the computer 160. The driver 172 may be provided by the computer manufacturer or may be a part of the operating system. The driver 172 both sends and receives information from the printer 162. For example, the driver 172 may send configuration information and data to be printed from the computer 160 to the printer 162 and may receive print cost and usage information from the printer 162 for display on the computer 160.

In this third exemplary embodiment, as in the first, the printer 162 collects usage information and calculates print costs. This cost and usage information may then be displayed in any suitable manner, such as on a display panel on the printer 162, or in dialog boxes or windows provided by the driver 172 on the computer 160. Alternatively, the accumulation of usage information and calculation, storage and display of printer usage and costs may be performed in the computer 160, with the printer 162 simply providing usage information not otherwise obtainable by the computer 160. For example, the printer 162 may indicate to the computer 160 the amount of coloring agent used on each printed page. The computer 160 may already be aware of other printer settings such as the print media type and size and the print quality setting if they were configured by the driver 172.

Figure 5:
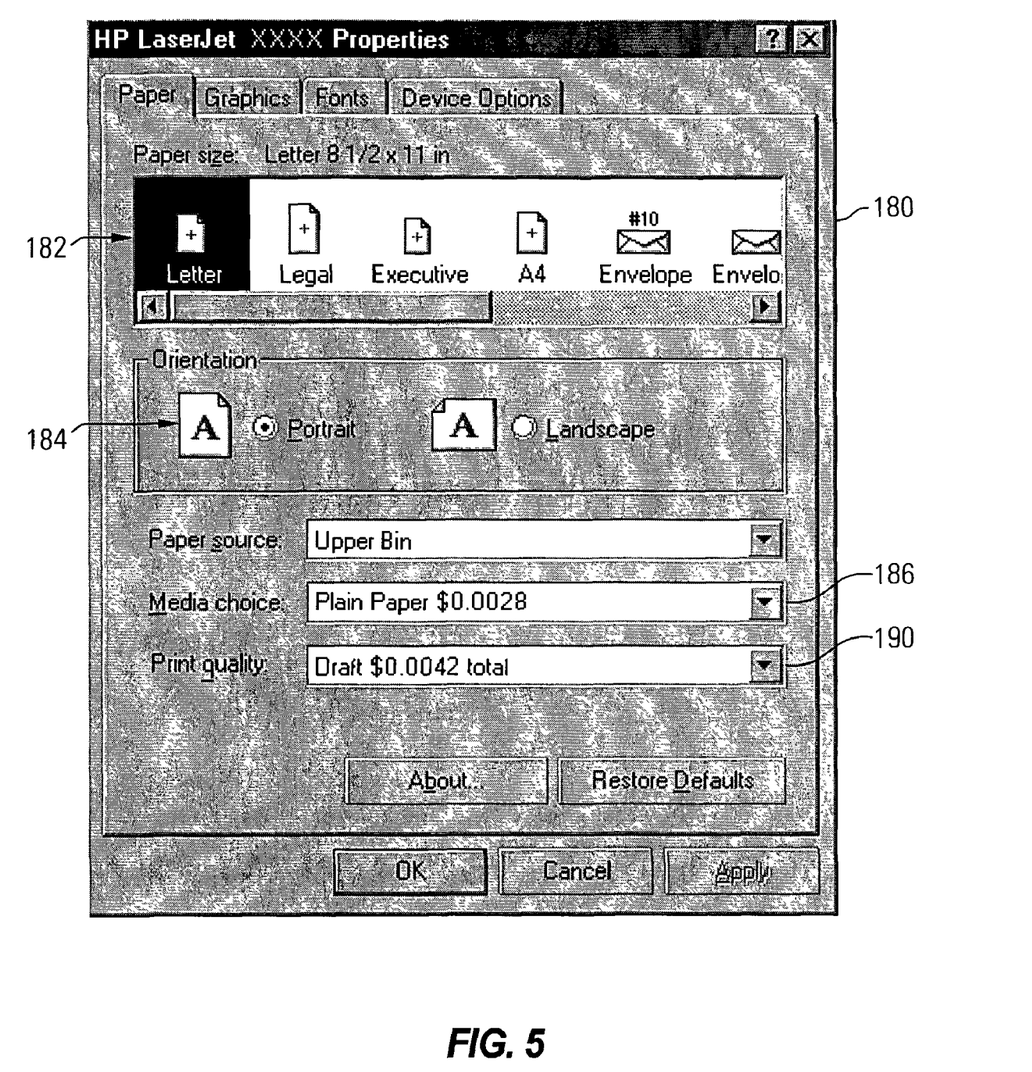
FIG. 5 is a screen capture of an exemplary driver dialog box in a computer which reports print cost and usage information for a connected printer.

An exemplary driver dialog box 180 that may be displayed on a computer 160 is illustrated in FIG. 5. The driver dialog box 180 enables the user to select among the various available printer settings, such as the paper size 182 and orientation 184. Additional cost information, based on printer usage information and consumable prices entered into either the printer 162 or computer 160, is displayed as well to inform the user of print costs. In this exemplary driver dialog box 180, a media choice selector 186 allows the user to select the print media type, such as plain paper or cardstock. The cost per page of the print media type is displayed, based on the media type selected and the paper size 182, as entered into the printer 162 or computer 160 with other consumable prices. As described above, consumable prices may be entered so that local prices for various printer consumables can be customized, overriding the defaults provided with the printer 162.

In this exemplary driver dialog box 180, a print quality selector 190 allows the user to select the print quality, such as draft or best. The total average printing price per page is displayed with the print quality selection 190. This total average printing price per page, in one exemplary embodiment, may be based on the price of the selected media according to its type and size, the average amount of coloring agent used per page with the current settings, and the price of that amount of coloring agent.

The display of cost and usage information may be arranged and broken down as desired, such as separating the cost of print media and each type of coloring agent, or making one average value including all these factors. The information may also be presented in detail in one location with summaries provided in more convenient locations. Costs may be as detailed as desired. For example, costs may be rounded off to the nearest cent, or may be displayed with additional significant digits to distinguish between similar options (as in the $0.0028 media cost per page 186 or the $0.0042 total cost per page 190 in the exemplary driver dialog box 180 of FIG. 5.)

Several exemplary methods of reporting print cost and usage information will now be summarized. In the discussion that follows, flow charts will be referred to. It is to be understood that any blocks or process steps in these flow charts may represent modules, segments, or blocks of code or electronic hardware that include one or more executable instructions for implementing specific logical functions or steps in the process. It is important to note that although particular exemplary steps are described, alternative embodiments are possible. For example, steps may be executed in an order different from that shown, including partly or fully concurrently, depending on the desired functionality.

Figure 6:
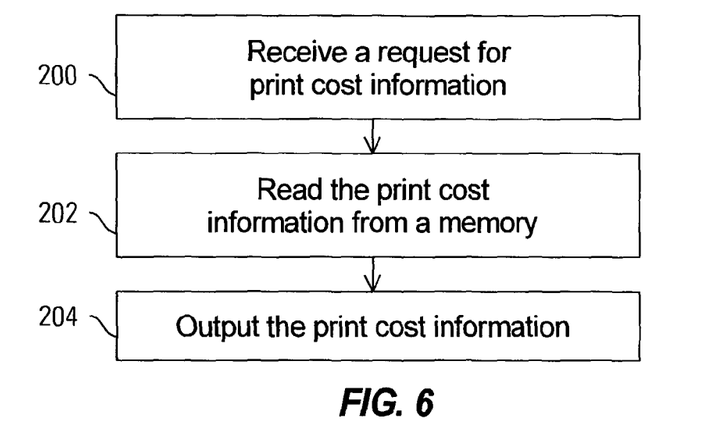
FIG. 6 is a flow chart of an exemplary operation of reporting consumable cost information for a printer.

Referring now to FIG. 6, cost reporting for a printer may include receiving 200 a request for print cost information, reading 202 the print cost information from a memory, and outputting 204 the print cost information. Each of these three tasks may be performed by any suitable device with access to the information for the relevant printer, including, for example, the printer or a computer connected to the printer, or by a combination of multiple devices.

Print costs may be provided by the printer manufacturer, or may be based on usage information for the particular printer. The print costs, if calculated for the particular printer, may be calculated by any suitable device, including, for example, the printer or a computer connected to the printer. Print costs and usage information may be displayed in any suitable manner, such as on the printer or on a connected computer, etc.

Figure 7:
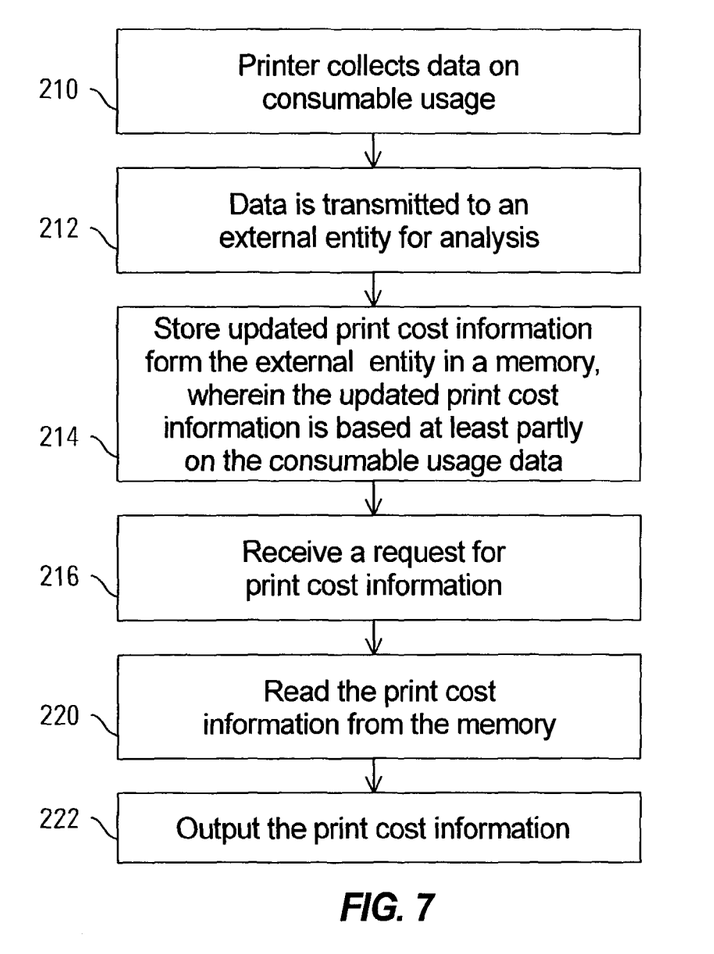
FIG. 7 is a flow chart of an exemplary operation of transferring usage information for a printer to an external entity for print cost calculation.

Referring now to FIG. 7, print costs may also be calculated by an external entity. In this case, the cost and usage reporting includes the printer collecting 210 data on consumable usage in the printer. The data is transmitted 212 to an external entity for analysis, and updated print cost information from the external entity is stored 214 in a memory, wherein the updated cost information is based at least partly on the consumable usage data. This memory may be in any accessible location, such as the printer or a computer connected to the printer, so that it can be provided when requested. When a request is received 216 for print cost information, the print cost information is read 220 from the memory and outputted 222 in any suitable manner, and by any device in the system, as described above.

Figure 8:
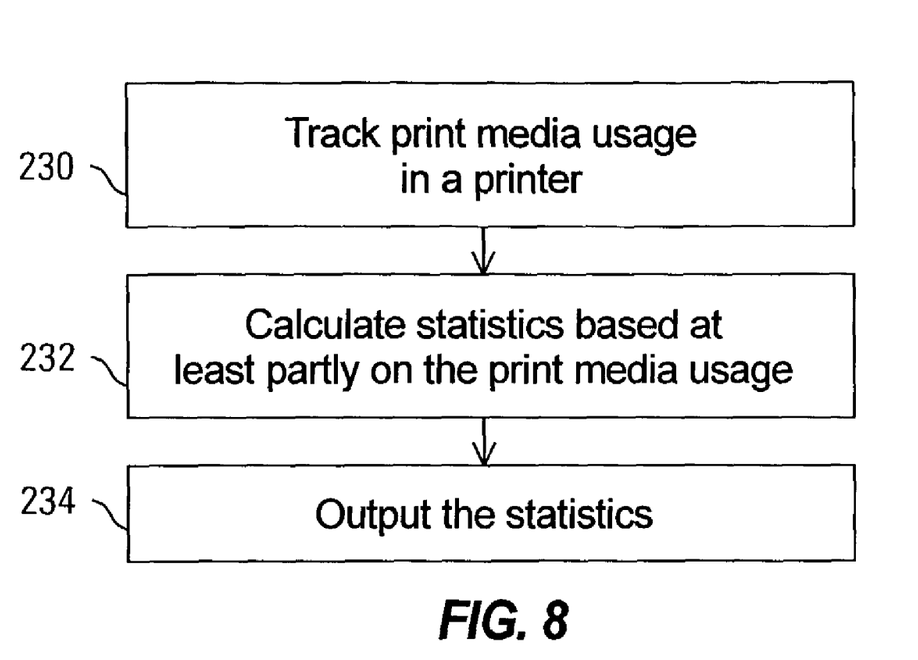
FIG. 8 is a flow chart of an exemplary operation of providing statistics on print media usage for a printer.

Referring now to FIG. 8, printer usage reporting may include tracking 230 print media usage in a printer, calculating 232 statistics based at least partly on the print media usage, and outputting 234 the statistics. These statistics may include any desired information on print media usage, such as the rate of usage of each available type and size of print media.

Figure 9:
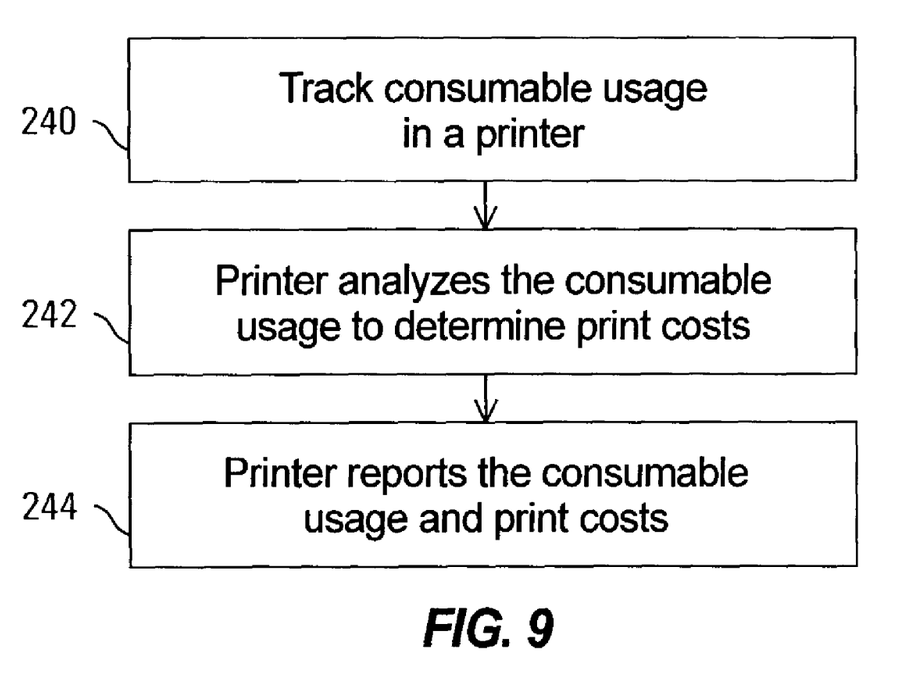
FIG. 9 is a flow chart of an exemplary operation of reporting consumable usage and print cost information for a printer.

Referring now to FIG. 9, print cost reporting may include tracking 240 consumable usage in a printer, the printer analyzing 242 the consumable usage to determine print costs, and the printer reporting 244 the consumable usage and print costs.

Print cost and usage reporting thus provides a great deal of beneficial information to users of a printer, helping users plan and budget print tasks, manage consumable printer supplies, and intelligently configure the printer. Print cost and usage reporting can also provide a manufacturer with information to improve printer design and print quality settings.

While illustrative embodiments of the invention have been described in detail herein, it is to be understood that the inventive concepts may be otherwise variously embodied and employed, and that the appended claims are intended to be construed to include such variations, except as limited by the prior art.

What is claimed is:

1. A method of reporting print costs for a printer, the method comprising:
   updating print cost information in said printer, said updating comprising executing code with a processor to:
   collect data by said printer on consumable usage, said consumable usage data including quantity of at least one coloring agent used;
   transmit said data to an external entity for analysis; and
   store updated print cost information from said external entity in a memory, wherein said updated print cost information is based at least partly on said data;
said method further comprising:
   receiving a request for said print cost information;
   reading said print cost information from a said memory; and
   outputting said print cost information.

2. The method of claim 1, wherein said memory is in said printer.

3. The method of claim 1, wherein said memory is in a computer connected to said printer.

4. The method of claim 1, wherein said print cost information comprises cost information for print media.

5. The method of claim 1, wherein said print cost information comprises cost information for said at least one coloring agent.

6. The method of claim 1, wherein said updated print cost information is based upon said data from a plurality of printers.

7. The method of claim 1, wherein said print cost information comprises print cost per page for each of a plurality of printer settings.

8. A printer, comprising:
at least one metering device for dispensing consumables in said printer, said at least one metering device counting a number of dots printed per page for a given color; and
at least one accounting device connected to said at least one metering device for tracking usage of said consumables and for calculating print costs, said at least one accounting device calculating a volume of a given coloring agent used per page based on said number of dots and calculating said print costs at least in part based on said volume and a price for a unit of said coloring agent.

9. The printer of claim 8, wherein said print costs are calculated at least in part based on said usage of said consumables.

10. The printer of claim 8, wherein said cost calculator calculates said print costs for each of a plurality of print settings in said printer.

11. The printer of claim 8, wherein said at least one metering device comprises a media handler.

12. The printer of claim 8, wherein said at least one metering device comprises a coloring agent dispenser.

13. A method of providing printer information, the method comprising:
tracking print media usage in a printer;
executing code with a processor to calculate statistics based at least partly on said print media usage, said statistics comprising at least one member selected from the group consisting of frequency of usage by print media size, frequency of usage by print media type, an amount of consumed print media for a given time period, a cost of consumed print media for a given time period, how long a given amount of a print media type will last; and outputting said statistics.

14. A method of providing printer information, comprising:
tracking consumable usage in a printer, said consumable usage comprising at least one member selected from the group consisting of amount of a coloring agent used per page overall, amount of a coloring agent used per job, amount of a coloring agent used per page in a given print quality setting, number of pages per job, number of pages per job in a given print quality setting, average amount of all types of print media consumed in a given time period, amount of print media of a given type consumed in a given time period, frequency of usage of a given print quality setting, and average life of a unit of a coloring agent;
analyzing by said printer said consumable usage to determine print costs, said print costs comprising at least one member selected from the group consisting of an average cost per page for a given print quality setting, average cost of print media consumption for a given time period, average cost per job, average cost per page per job, and average printing cost for a given time period; and
said printer reporting said consumable usage and print costs.

15. The method of claim 14, wherein said print costs are determined at least in part based on unit prices for consumables used in said printer.

16. The method of claim 14, wherein said printer reports said consumable usage and print costs via a front panel in said printer.

17. The method of claim 14, wherein said printer reports said consumable usage and print costs via an embedded web server in said printer.

18. The method of claim 14, wherein said printer reports said consumable usage and print costs via a printer driver in an associated computer.

* * * * *